(12) United States Patent
Kim et al.

(10) Patent No.: US 10,758,882 B2
(45) Date of Patent: Sep. 1, 2020

(54) DEVICE FOR DRYING AND RECOVERING CARBON NANOTUBE PRODUCT AND METHOD FOR MANUFACTURING CARBON NANOTUBE USING SAME

(71) Applicant: LG CHEM, LTD., Seoul (KR)

(72) Inventors: Ogsin Kim, Daejeon (KR); Kwang Woo Yoon, Daejeon (KR); Seungyong Lee, Daejeon (KR); Dong Hyun Cho, Daejeon (KR); Seokwon Kim, Daejeon (KR); Jihee Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 346 days.

(21) Appl. No.: 15/769,194

(22) PCT Filed: Jul. 12, 2017

(86) PCT No.: PCT/KR2017/007459
§ 371 (c)(1),
(2) Date: Apr. 18, 2018

(87) PCT Pub. No.: WO2018/012876
PCT Pub. Date: Jan. 18, 2018

(65) Prior Publication Data
US 2018/0304218 A1    Oct. 25, 2018

(30) Foreign Application Priority Data

Jul. 14, 2016  (KR) .......................... 10-2016-0089098

(51) Int. Cl.
*B01J 6/00*       (2006.01)
*F23G 7/06*       (2006.01)
(Continued)

(52) U.S. Cl.
CPC .............. *B01J 6/002* (2013.01); *B01J 2/16* (2013.01); *B01J 6/00* (2013.01); *B01J 6/008* (2013.01);
(Continued)

(58) Field of Classification Search
CPC ....... B01J 6/002; B01J 6/00; B01J 2/16; B01J 6/008; C08K 3/04; F23G 7/06;
(Continued)

(56) References Cited

U.S. PATENT DOCUMENTS

| | | | |
|---|---|---|---|
| 2009/0001326 A1 | 1/2009 | Sato et al. | |
| 2010/0016148 A1 | 1/2010 | Lim et al. | |

(Continued)

FOREIGN PATENT DOCUMENTS

| | | | | |
|---|---|---|---|---|
| JP | 5117251 B2 | 1/2013 | | |
| JP | 5408619 | * | 2/2014 | ............... B01J 2/04 |

(Continued)

*Primary Examiner* — Daniel C. McCracken
(74) *Attorney, Agent, or Firm* — Dentons US LLP

(57) ABSTRACT

The present invention relates to a device for drying and collecting a product such as a carbon nanotube pellet or aggregate, which can accelerate solvent evaporation by inserting and dispersing high temperature gas into a drying column as well as by a heat source inside and outside of the column, and can quickly remove the evaporated solvent. Further, the device can be used for drying and collecting processes while minimizing product breakage by regulating the gas flow rate and controlling flow of the product in the column. Thus, the device can be effectively applied to mass production of a carbon nanotube pellet product.

20 Claims, 6 Drawing Sheets

(51) Int. Cl.
  *C01B 32/16* (2017.01)
  *B01J 2/16* (2006.01)
  *C08K 3/04* (2006.01)
  *B82Y 30/00* (2011.01)
  *B82Y 40/00* (2011.01)

(52) U.S. Cl.
  CPC ............... *C01B 32/16* (2017.08); *C08K 3/04* (2013.01); *F23G 7/06* (2013.01); *B82Y 30/00* (2013.01); *B82Y 40/00* (2013.01)

(58) Field of Classification Search
  CPC ......... C01B 32/16; B82Y 30/00; B82Y 40/00; B29B 2009/125; B29B 9/10
  See application file for complete search history.

(56) References Cited

U.S. PATENT DOCUMENTS

| | | | |
|---|---|---|---|
| 2011/0052702 A1* | 3/2011 | Asakawa | B01J 2/04 424/489 |
| 2012/0067789 A1* | 3/2012 | Bullinger | F26B 23/001 209/133 |
| 2015/0059571 A1 | 3/2015 | Denton et al. | |

FOREIGN PATENT DOCUMENTS

| | | |
|---|---|---|
| JP | 5408619 B2 | 2/2014 |
| KR | 10-2009-0119518 A | 11/2009 |
| KR | 10-2014-0049859 A | 4/2014 |
| KR | 10-2015-0129090 A | 11/2015 |
| KR | 10-2016-0036910 A | 4/2016 |

\* cited by examiner

DEVICE FOR DRYING AND RECOVERING CARBON NANOTUBE PRODUCT AND METHOD FOR MANUFACTURING CARBON NANOTUBE USING SAME This application is a National Stage Entry of International Application No. PCT/KR2017/007459 filed on Jul. 12, 2017, and claims the benefit of Korean Application No. 10-2016-0089098, filed on Jul. 14, 2016, all of which are hereby incorporated by reference in their entirety for all purposes as if fully set forth herein.

TECHNICAL FIELD

The present application claims the benefit of priority to Korean Patent Application No. 10-2016-0089098, filed on Jul. 14, 2016, which is incorporated herein by reference in its entirety for all purpose.

The present invention relates to a device for drying and collecting a carbon nanotube product which can prevent product damage and enhance the drying efficiency in drying and collecting the carbon nanotube product such as a pellet or an aggregate of carbon nanotubes, and a method for manufacturing a carbon nanotube product using same.

BACKGROUND ART

Nano-size materials have recently become a major research source due to their unique optical and electrical properties and their potential use in electronics or photo-electronic engineering. The field of nanostructured material or nanostructure includes both of multi-dimensional nanostructures such as nanotubes and self-assemblies and technology development applying thereof. The nanostructures can be classified into inorganic nanostructures, organic nanostructures, polymer inorganic nanostructures, porous high surface area nanostructures and bio-related nanostructures depending on materials. The inorganic nanostructures are structures getting attention in relation to mainly semi-conductors, and quantum structures, single electronic devices, next-generation memory devices and self-recording media researches are included therein. The organic nanostructure field includes fullerene, carbon nanotubes, carbon nanofibers, diamond thin film, organic EL and the like. The polymer inorganic nanostructures have two major fields: nanostructured polymers and ceramic particles of nanoparticle. The porous high surface area nanostructures include activated carbon fibers, zeolites and photocatalytic particles. The bio-related nanostructures include drug delivery systems, biomimetic devices, high sensitive nanosensor materials and the like.

In particular, carbon nanotubes have been subject to numerous studies for years due to their unique physical and electrical properties. The carbon nanotubes exhibit subconductor, conductor or semiconductor properties according to the chirality of the tube itself, carbon atoms are connected by strong covalent bonds, which makes tensile strength about 100 times larger than steel, the carbon nanotubes has excellent flexibility and elasticity as well as chemical stability. The carbon nanotubes are industrially important in the manufacture of composite materials due to their size and specific physical properties, and have high utilization in electronic materials, energy materials and other fields. For example, the carbon nanotubes can be applied to electrodes of electrochemical storage devices such as secondary batteries, fuel batteries or super capacitors, electromagnetic wave shielding materials, field emission displays, or gas sensors.

Because the nanostructured materials are provided in the form of powder of tens of micrometer in the actual process, they can cause harmfulness to the human body and malfunction of electrical products due to dusting in the process. In particular, in the case of carbon-based organic nanostructures, it is difficult to be dispersed due to large difference from polymers desired to mix in the apparent density.

In order to solve these problems, the nanostructured material may be compressed, and as a method for compressing carbon nanotubes, usually a method of palletization is provided due to increase of the density and easy of handling and transportation.

The carbon nanotube product, for example, a pellet-type carbon nanotube product is convenient to be used in various processing devices. In order to granulating or pelletizing carbon nanotubes, two different conventional methods, i.e., a method of wet-type pelletizing carbon nanotubes followed by drying thereof and a method of dry-type pelletizing, are used.

In general, the dry-type palletization uses a pelletization drum which comprises a horizontally positioned rotation tube, and the inside of the tube is referred to as a palletization chamber. Granulation of the carbon nanotube powder is performed by pre-condensing powder for industrial use and tumbling down thereof from the wall of a tube rotating in the pelletization drum for granulation. The powder is agglomerated by Van-der-Waals force and electrostatic force making the dry-type pelletization possible, and for the dry-type pelletization, usually pressure of several tons is applied. Thus, there is a problem that pellets may be rebroken during the manufacturing process.

The wet-type pelletizing process is performed mainly by a liquid bridge between carbon nanotubes and the capillary force. In the past, when mixing the carbon nanotubes by the wet-type pelletization, excessive solvents such as water or ethanol are added due to bad distribution of moisture and a binder, and the added solvents are generally hot-air dried, or heat-dried by using a rotary drum dryer or an agitated pan, or a conveyer. However, in the case of the method using a rotary drum or an agitated pan, there is a worry that the product may be damaged by a rotor, and in the case of the method using a conveyer, the spatial efficiency is deteriorated. In the case of the general hot-air drying, the drying efficiency is largely deteriorated.

DISCLOSURE

Technical Problem

Accordingly, in order to solve the existing problems, the present invention is objected to provide a device which reduces damage or breakage of a product when drying or collecting a carbon nanotube pellet or aggregate and also has excellent drying efficiency.

Technical Solution

In order to solve the above technical problem, the present invention provides a device for drying and collecting a carbon nanotube product comprising:

a drying part, which receives a carbon nanotube product to be dried and dries the product;

a product collecting part, which is installed at the bottom of the drying part;

a gas inlet part, which is installed on top of the drying part or between the drying part and the product collecting part, for flowing gas into the drying part; and a valve, which is installed between the drying part and the product collecting part and has a plurality of opening parts allowing fluid communication.

According to one embodiment, the gas inlet part may be installed between the drying part and the product collecting part, and the valve may comprise:

a first valve installed between the drying part and the gas inlet part, and a second valve installed between the gas inlet part and the product collecting part.

The opening part of the first valve may allow gas from the gas inlet part to flow into the drying part while preventing the product from flowing out to the collecting part during the product drying process in the drying part.

The carbon nanotube product may be a carbon nanotube pellet or a carbon nanotube aggregate.

Further, the drying part may be vertical column type.

The first valve or the second valve may be each independently a butterfly valve or a damper valve.

The first valve may have a plurality of opening parts on the surface of a wing part of the butterfly valve or the damper valve.

Further, a mesh sheet through which the carbon nanotube product can't be communicated but only a fluid can be communicated may be put over a part or a whole of the opening part.

Further, a bubble cap may be covered over a part or a whole of the opening part.

Further, the device may further comprise a preheater for preheating the gas to be flowed into the gas inlet part.

Further, the device may further comprise a flow rate controller for controlling the follow rate of the gas to be flowed into the gas inlet part.

Further, a gas outlet may be installed on top of the drying part to control pressure in the drying part.

Further, a third valve may be installed at the bottom of the product collecting part to discharge a product.

Further, a second gas inlet part may be installed at the product collecting part to introduce gas which helps discharge of a product.

Further, the present invention provides a method for manufacturing a carbon nanotube product by using the aforementioned device.

Specifically, the method may comprise the steps of:

receiving a carbon nanotube product to be dried in a drying part;

drying the carbon nanotube product while flowing gas into the drying part through a gas inlet part installed on top of the drying part or between the drying part and a product collecting part at the bottom of the drying part;

controlling pressure in the drying part by discharging gas through a gas outlet installed on top of the drying part; and collecting the dried carbon nanotube product through the product collecting part installed at the bottom of the drying part, wherein a valve having a plurality of opening parts allowing fluid communication may be installed between the drying part and the product collecting part, so that gas flow is allowed while preventing discharge of the product during the product drying process in the drying part.

Further, the gas inlet part may be installed between the drying part and the product collecting part, and the valve having a plurality of opening parts may comprise: a first valve installed between the drying part and the gas inlet part and a second valve installed between the gas inlet part and the product collecting part, wherein when proceeding a drying process, the gas flows in with the first valve closed to proceed the drying process, and when collecting the dried product, the first valve is opened to introduce the product into the gas inlet part, and then the first valve is closed and the second valve is opened to introduce the product into the collecting part.

Further, a second gas inlet part may be installed at the product collecting part to introduce gas which helps discharge of a product.

According to one embodiment, the method for manufacturing a carbon nanotube product may further comprise the steps of:

pyrolyzing an organic compound with a transition metal or its compound as a catalyst in a pyrolysis furnace to obtain a carbon nanotube product to be introduced into the drying part;

separating reactive exhaust gas generated at the pyrolysis process from the carbon nanotube product; and incinerating the reactive exhaust gas separated from the carbon nanotube product.

According to one embodiment, the exhaust gas discharged from the gas outlet may be incinerated. Further, the reactive exhaust gas generated at a pyrolysis process for manufacturing a carbon nanotube product may also be incinerated when incinerating the exhaust gas.

Other details of embodiments of the present invention are described in the following detailed specification.

Advantageous Effects

The device for drying and collecting a carbon nanotube pellet or aggregate according to the present invention can accelerate solvent evaporation by inserting and dispersing high temperature gas into a drying column as well as by a heat source inside and outside of the column, and can quickly remove the evaporated solvent. Further, the device can proceed drying and collecting processes while minimizing product breakage by regulating the gas flow rate and controlling flow of the product in the column. As a result, a product can be obtained in the final percentage of water content of 1% or less and the damage rate of less than 5%.

MODE FOR INVENTION

Figure 1:
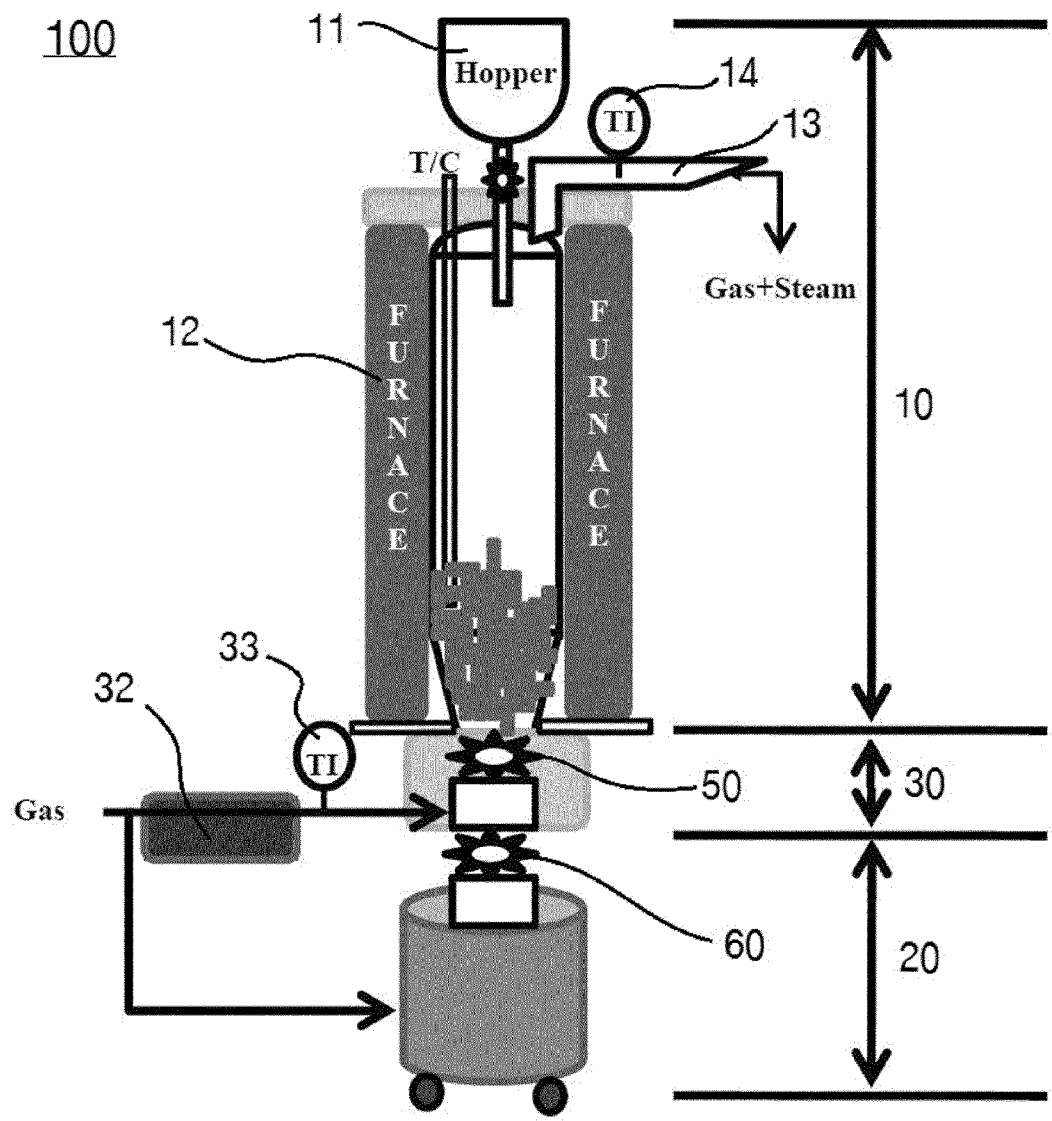
FIG. 1 is a schematic diagram of a device for drying and collecting a carbon nanotube product according to one embodiment of the present invention.

Prior to a detailed description of the present invention, the present invention may be variously modified and altered and have several exemplary embodiments. Examples described below and illustrated in the drawings are not to limit the present invention to specific exemplary embodiments. In addition, various modifications, alterations, and amendments may be made in the scope of the following claims, and it may be understood that these modifications, alterations, and amendments fall within the scope of the present invention. When it is decided that a detailed description for the known art related to the present invention may unnecessarily obscure the gist of the present invention, the detailed description will be omitted.

It is to be understood that when one element is referred to as being "connected to" or "coupled to" another element, it may be connected directly to or coupled directly to another element with the other element intervening therebetween.

Singular forms include plural forms unless the context clearly indicates otherwise.

It will be further understood that terms "include", "have", or the like, used in the present specification are to specify the presence of features, numerals, steps, operations, components, parts mentioned in the present specification, or a combination thereof, but do not preclude the presence or addition of one or more other features, numerals, steps, operations, components, parts, or a combination thereof.

The term "carbon nanotube" used in the present specification may refer to a singular or plural carbon nanotube, and the term may include a fiber form formed by a plurality of carbon nanotubes.

Hereinafter, with reference to drawings, embodiments of the present invention are described in detail in a manner that one of ordinary skill in the art may perform the embodiments without undue difficulty. The present invention may be embodied in various forms, and the scope of the present invention is not limited to examples provided herein.

BEST MODE CARRYING OUT THE INVENTION

The device according to the present invention comprises:
a drying part, which receives a carbon nanotube product to be dried and dries the product;
a product collecting part, which is installed at the bottom of the drying part;
a gas inlet part, which is installed on top of the drying part or between the drying part and the product collecting part, for flowing gas into the drying part; and
a valve, which is installed between the drying part and the product collecting part and has a plurality of opening parts allowing fluid communication.

In the present invention, the carbon nanotube product may refer to a carbon nanotube pellet or a carbon nanotube aggregate.

FIG. 1 schematically illustrates a device for drying and collecting a carbon nanotube product, wherein a gas inlet part is installed between the drying part and the product collecting part, according to one embodiment of the present invention. Namely, FIG. 1 illustrates a structure designed to make gas flow from bottom to top of the drying part. However, the present invention is not limited thereto and also contains a structure wherein the gas flows from top to bottom of the drying part. When the gas flow from top to bottom of the drying part, the heat transferred from the furnace wrapping the heating part can be directly transferred to the gas, and therefore drying can be conducted with the gas of higher temperature.

FIG. 1 illustrates a device for drying and collecting a carbon nanotube product 100 comprises:
a drying part 10, which receives a carbon nanotube product to be dried and dries the product;
a product collecting part 20, which is installed at the bottom of the drying part;
a gas inlet part 30, which is installed between the drying part 10 and the product collecting part 20, for flowing gas into the drying part;
a first valve 50 installed between the drying part 10 and the gas inlet part 30 and has a plurality of opening parts allowing fluid communication; and
a second valve 60 installed between the gas inlet part and the product collecting part.

The drying part 10 may be vertical column type, and equipped with a heating means 12 for heating the drying part. As illustrated in FIG. 1, the heating means 12 may be a furnace wrapping the drying part 10, but not limited thereto.

The device illustrated in FIG. 1 preferably further comprises a preheater 32 for preheating the gas to be flowed into the gas inlet part 30, and a flow rate controller 33 for controlling the follow rate of the gas to be flowed into the gas inlet part 30. The gas introduced in to the gas inlet part 30 is used to prevent agglomeration of a product in the drying part 10 and to promote drying the product in the drying part 10 by adding additional heat. Accordingly, the gas may preferably be inert gas which does not react with the product. Nitrogen gas is most preferred, but not limited thereto.

Further, a gas outlet 13 may be installed on top of the drying part 10 to control pressure in the drying part 10 by controlling the amount of the discharged gas 14.

On the other hand, whether the product in the drying part 10 reaches a predetermined dried state or not can be checked by a method of measuring the temperature change in the drying part 10 (i.e., check whether there is little temperature change) or a method of measuring moisture in the exhaust gas discharged from the outlet 13 (e.g., using a hygrometer) to check whether the moisture content is within a certain level or not, but not limited thereto. The exhaust gas discharged from the gas outlet 13 may mainly contain nitrogen or water, but if an organic solvent is used instead of water when preparing a CNT pellet, the gas may contain a large quantity of the solvent evaporated during the product drying process. The gas may be evaporated or incinerated. However, if the gas is unreactive or flame retardant, the incineration efficiency may be deteriorated. It is also possible to incinerate this unreactive and flame retardant exhaust gas together with the exhaust gas discharged from the carbon nanotube synthesis process, i.e., the flammable reactive exhaust gas containing hydrogen, hydrocarbon and the like. Namely, when the reaction of the carbon nanotube synthesis process is finished, the reactive exhaust gas remained in a reaction system or a reactive exhaust gas feeding line can be incinerated by purging the gas with the unreactive and flame retardant gas discharged from the process according to the present invention, and therefore, backfiring into the reactive exhaust gas feeding line can be prevented and also the combustion efficiency can be increased.

Figure 2:
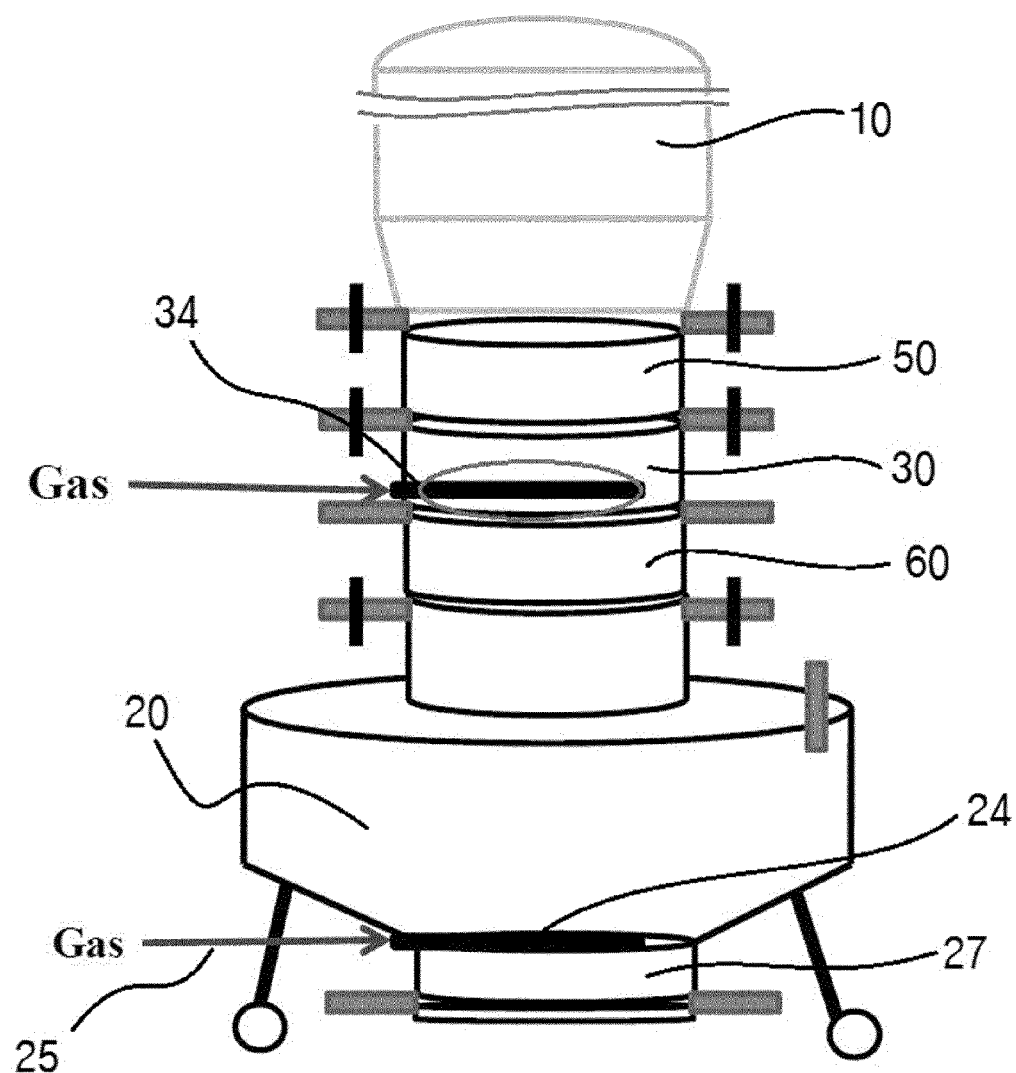
FIG. 2 is a schematic diagram partially magnifying the device of FIG. 1.

FIG. 2 is a schematic diagram for describing constitution of the gas inlet part 30 and the product collecting part 20 in more detail.

The gas inlet part 30 is equipped with a nozzle 34 for spraying the introduced gas upward toward the drying part 10 thereby feeding the gas through the opening part of the first valve 50, preferably. The shape of the nozzle 34 may refer to FIG. 3.

Further, as illustrated in FIG. 2, the first valve 50 is installed at to bottom of the drying part 10, whereunder the gas inlet part 30 and the second valve 60 are installed.

Figure 3:
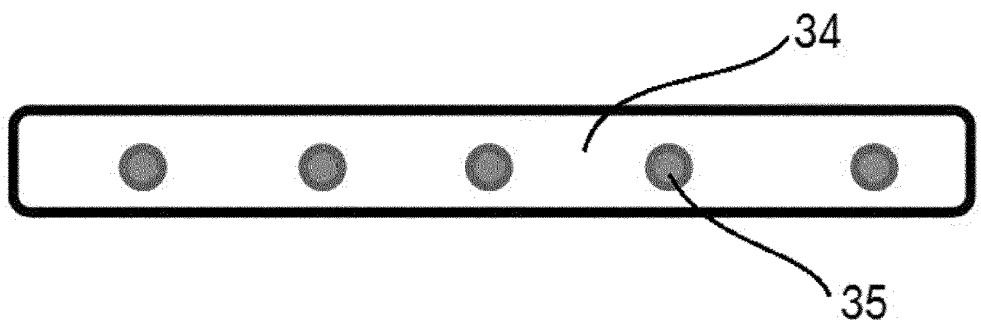
FIG. 3 is a diagram schematically illustrating shape of the spray nozzle illustrated in FIG. 2.

The product collecting part 20 may be located below the second valve 60, and for easier product collecting, the second gas inlet 25 and the third valve 27 may be installed at the bottom of the product collecting part 20. The gas introduced through the second gas inlet 25 is sprayed through the spray nozzle 24 to prevent agglomeration of the product during the product discharging process. The shape of the spray nozzle 24 may be the same as illustrated in FIG. 3, but not limited thereto. The gas to be introduced may preferably be inert gas and there is no need to preheat the gas.

Figure 4:
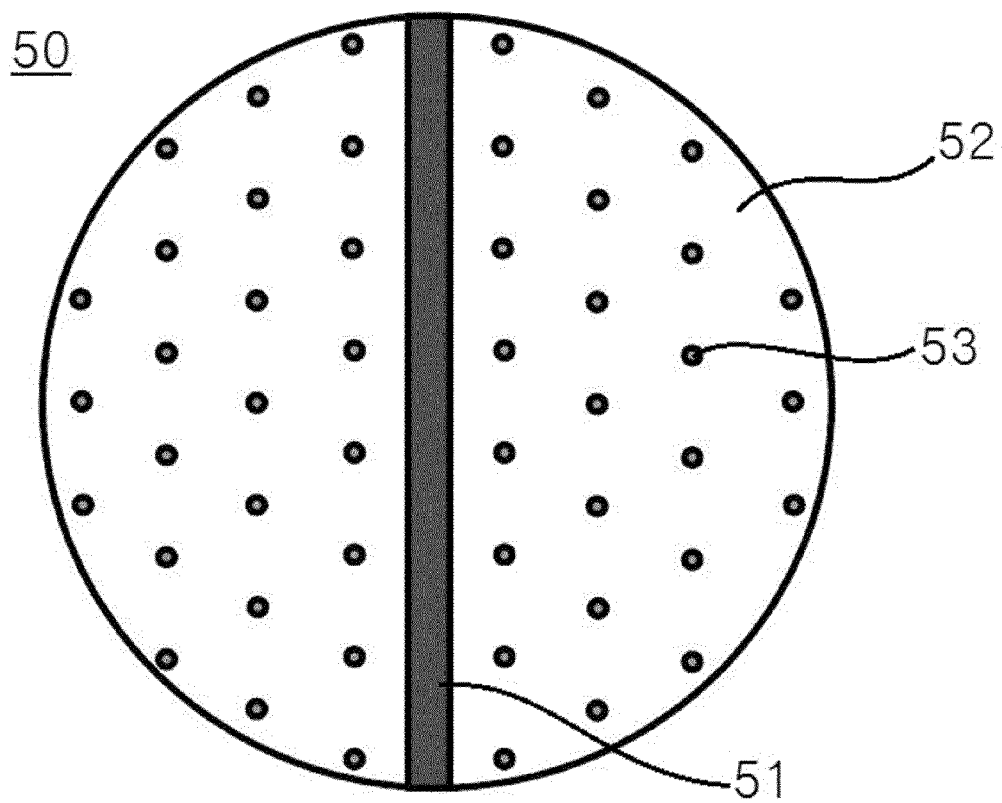
FIG. 4 and FIG. 5 are plane figures schematically illustrating an embodiment of a first valve.
Figure 5:
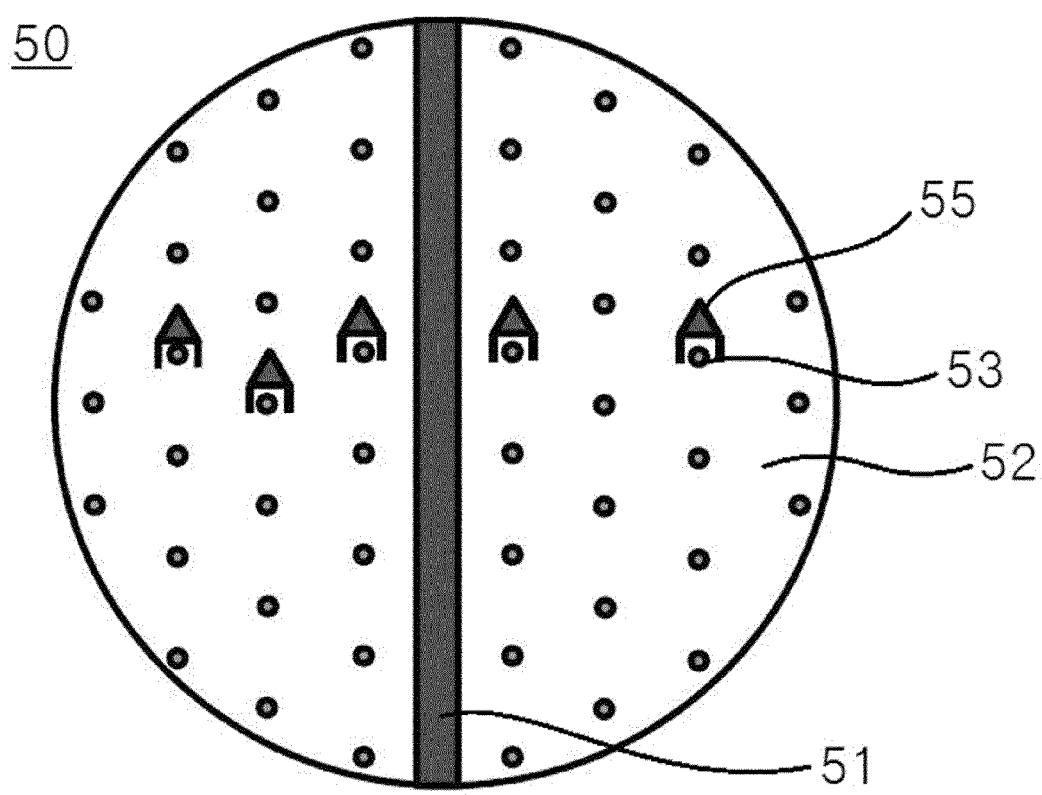

FIG. 4 to FIG. 5 illustrate an example of the first valve 50. The valve may be a butterfly valve or a damper valve. The first valve has a central axis 51. Accordingly, the valve is rotatable and foldable on the axis and therefore, the valve is openable.

In order to prevent the product flowing out during product drying, the butterfly valve or the damper valve is used. However, the valve blocks the gas flow when the valve is closed, and therefore hot air flow of the upper part of the valve (drying part) is reduced. Thus, it causes reduction of the drying efficiency. According to the present invention, the opening part 53 of the first valve 50 may improve the drying efficiency by allowing hot air flow through introduction of the gas from the gas inlet part 20 to the drying part 10, while preventing the product from discharging to the collecting part 20 during the product drying process in the drying part 10.

Figure 6:
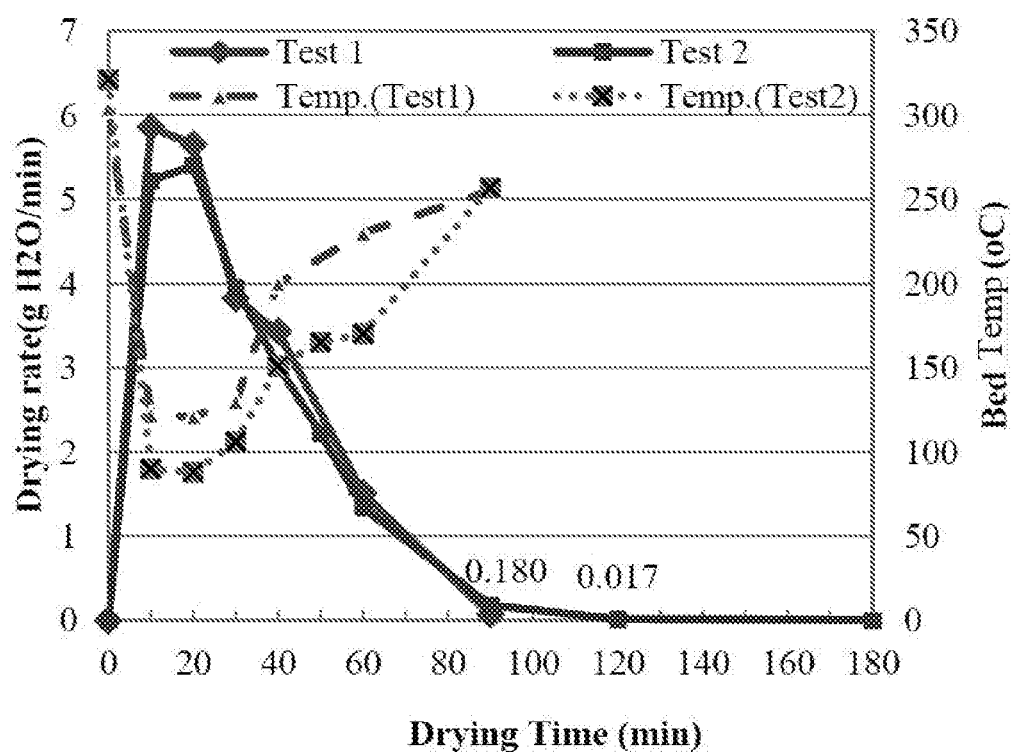
FIG. 6 and FIG. 7 are graphs showing the results of the tests according to the present invention.

For the second valve 60 or the third valve 27, a butterfly valve or a damper valve without an opening part can be used. Namely, as illustrated in FIG. 4 to FIG. 6, the first valve may have a plurality of opening parts 53 on the surface of a wing part 52 of the butterfly valve or the damper valve.

Further, not illustrated herein, a mesh sheet through which the carbon nanotube product can't be communicated but only flow can be communicated may be put over a part or a whole of the opening part 53.

According to another embodiment, as illustrate in FIG. 5, a bubble cap 55 may be covered over a part or a whole of the opening part 53.

According to the present invention, by placing the first valve 50 and the second valve 60 at the bottom of the drying part 10, it is possible to feed hot air into the drying part by using the high temperature gas while first valve 50 is closed. Thus, the drying process can be proceeded efficiently. Further, during the collecting process of the dried product, it is possible to open the first valve 50 to introduce the product into the gas inlet 30, and then to close the first valve 50 and to open the second valve 60 to introduce the product into the collecting part 20. Thus, without stopping the drying process or lowering the temperature, it is possible to proceed the drying process and the product collecting process continuously.

Figure 7:
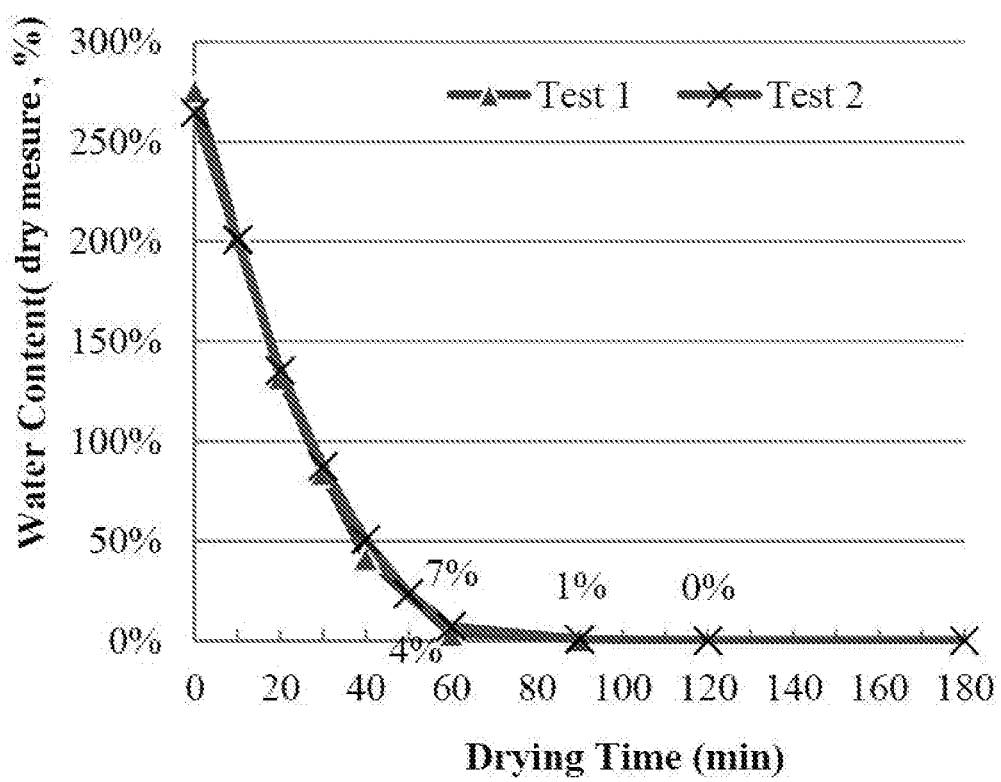

The device illustrated in FIG. 1 was assembled by using a lab-scale cylinder-type high temperature dryer (Internal diameter 50 mm quartz tube), and FIG. 6 and FIG. 7 show the results of tests performed with the device. Test conditions are as listed in the following Table 1.

TABLE 1

|  | Test 1 | Test 2 |
| --- | --- | --- |
| Input of CNT pellet | 300 g | 300 g |
| Drying time | 90 min | 180 min |

TABLE 1-continued

|  | Test 1 | Test 2 |
| --- | --- | --- |
| Nitrogen gas flow rate | 2.7 cm/s | 2.7 cm/s |
| Furnace temperature | 300° C. | 300° C. |

Namely, the tests were performed at the same conditions except for changing the drying time, and the drying rate, the percentage of water content and the bed temperature change were observed.

FIG. 6 shows the drying rate and the bed temperature according to the drying time, and FIG. 7 shows the percentage of water content according to the drying time.

According to the above results, in spite of short drying time of 90 min, the final percentage of water content is acceptable to 1% or less, and the damage rate was just less than 5%. Accordingly, it can be found that the drying efficiency of the compressed pellet difficult to be dried can be also enhanced, and the drying rate and the water content can be easily controlled.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A device for drying and collecting a carbon nanotube product comprising:
   a drying part, which receives a carbon nanotube product to be dried and dries the product;
   a product collecting part, which is installed at the bottom of the drying part;
   a gas inlet part, which is installed on top of the drying part or between the drying part and the product collecting part, for flowing gas into the drying part; and
   at least one valve, which is installed between the drying part and the product collecting part and has a plurality of opening parts allowing fluid communication.

2. The device for drying and collecting a carbon nanotube product according to claim 1, wherein the gas inlet part is installed between the drying part and the product collecting part, and the at least one valve comprises:
   a first valve installed between the drying part and the gas inlet part, and
   a second valve installed between the gas inlet part and the product collecting part.

3. The device for drying and collecting a carbon nanotube product according to claim 2, wherein the opening part of the first valve allows gas from the gas inlet part to flow into the drying part while preventing the product from flowing out to the collecting part during the product drying process in the drying part.

4. The device for drying and collecting a carbon nanotube product according to claim 1, wherein the carbon nanotube product is a carbon nanotube pellet or a carbon nanotube aggregate.

5. The device for drying and collecting a carbon nanotube product according to claim 1, wherein the drying part is vertical column type.

6. The device for drying and collecting a carbon nanotube product according to claim 2, wherein the first valve or the second valve is each independently a butterfly valve or a damper valve.

7. The device for drying and collecting a carbon nanotube product according to claim 6, wherein the first valve has a plurality of opening parts on the surface of a wing part of the butterfly valve or the damper valve.

8. The device for drying and collecting a carbon nanotube product according to claim 7, wherein a mesh sheet through which the carbon nanotube product cannot be communicated but only a fluid can be communicated is located over a part or a whole of the opening part.

9. The device for drying and collecting a carbon nanotube product according to claim 7, wherein a bubble cap is covered over a part or a whole of the opening part.

10. The device for drying and collecting a carbon nanotube product according to claim 1, which further comprises a preheater for preheating the gas to be flowed into the gas inlet part.

11. The device for drying and collecting a carbon nanotube product according to claim 1, which further comprises a flow rate controller for controlling the follow rate of the gas to be flowed into the gas inlet part.

12. The device for drying and collecting a carbon nanotube product according to claim 1, wherein a gas outlet is installed on top of the drying part to control pressure in the drying part.

13. The device for drying and collecting a carbon nanotube product according to claim 1, wherein a third valve is installed at the bottom of the product collecting part to discharge a product.

14. The device for drying and collecting a carbon nanotube product according to claim 13, wherein a second gas inlet part is installed at the product collecting part to introduce gas which helps discharge of a product.

15. A method for manufacturing a carbon nanotube product comprising the steps of:
   receiving a carbon nanotube product to be dried in a drying part;
   drying the carbon nanotube product while flowing gas into the drying part through a gas inlet part installed on top of the drying part or between the drying part and a product collecting part at the bottom of the drying part;
   controlling pressure in the drying part by discharging gas through a gas outlet installed on top of the drying part; and
   collecting the dried carbon nanotube product through the product collecting part installed at the bottom of the drying part,
   wherein a valve having a plurality of opening parts allowing fluid communication is installed between the drying part and the product collecting part, so that gas flow is allowed while preventing discharge of the product during the product drying process in the drying part.

16. The method for manufacturing a carbon nanotube product according to claim 15, wherein the gas inlet part is installed between the drying part and the product collecting part, and the valve having a plurality of opening parts comprises a first valve installed between the drying part and the gas inlet part and a second valve installed between the gas inlet part and the product collecting part,
   wherein when proceeding a drying process, the gas flows in with the first valve closed to proceed the drying process, and when collecting the dried product, the first valve is opened to introduce the product into the gas inlet part, and then the first valve is closed and the second valve is opened to introduce the product into the collecting part.

17. The method for manufacturing a carbon nanotube product according to claim 15, wherein a second gas inlet part is installed at the product collecting part to introduce gas which helps discharge of a product.

18. The method for manufacturing a carbon nanotube product according to claim 15, which further comprises the steps of:
   pyrolyzing an organic compound with a transition metal or its compound as a catalyst in a pyrolysis furnace to obtain carbon nanotubes to be introduced into the drying part;
   separating reactive exhaust gas generated at the pyrolysis process from the carbon nanotubes; and
   incinerating the reactive exhaust gas separated from the carbon nanotubes.

19. The method for manufacturing a carbon nanotube product according to claim 15, wherein the exhaust gas discharged from the gas outlet is incinerated.

20. The method for manufacturing a carbon nanotube product according to claim 19, wherein the reactive exhaust gas generated at a pyrolysis process for manufacturing a carbon nanotube product is also incinerated when incinerating the exhaust gas.

* * * * *